United States Patent
Avalos-Guzmán et al.

(10) Patent No.: US 8,464,555 B2
(45) Date of Patent: Jun. 18, 2013

(54) MONOLITHIC FLOAT GLASS FORMING CHAMBER AND METHOD OF CONSTRUCTION

(75) Inventors: Rafael Avalos-Guzmán, Nuevo León (MX); Humberto Valdés-Carrillo, Coahuila (MX); Felipe Pacheco-Salinas, Nuevo León (MX); Alberto Solís-Oba, Nuevo León (MX); Hugo Jaime Herrera-Campos, Nuevo León (MX)

(73) Assignee: Vidrio Plano de Mexico, S.A. de C.V., Garcia, Nuevo Leon (MX)

( * ) Notice: Subject to any disclaimer, the term of this patent is extended or adjusted under 35 U.S.C. 154(b) by 269 days.

(21) Appl. No.: 12/462,039

(22) Filed: Jul. 27, 2009

(65) Prior Publication Data
US 2011/0016924 A1    Jan. 27, 2011

(51) Int. Cl.
*C03B 5/00* (2006.01)
(52) U.S. Cl.
USPC ...................................... 65/182.5; 65/374.13
(58) Field of Classification Search
USPC ............... 65/90, 125, 182.5, 182.3, 335, 336, 65/347, 374.13; 501/128, 1
See application file for complete search history.

(56) References Cited

U.S. PATENT DOCUMENTS

| | | | |
|---|---|---|---|
| 3,220,816 A | | 11/1965 | Pilkington |
| 3,445,217 A | | 5/1969 | Dickinson et al. |
| 3,508,902 A | | 4/1970 | Cusick |
| 3,584,477 A | * | 6/1971 | Hainsfurther ................ 65/182.5 |
| 3,587,198 A | * | 6/1971 | Hensel ........................ 52/745.09 |
| 3,594,147 A | * | 7/1971 | Galey et al. .................. 65/182.5 |
| 3,762,908 A | * | 10/1973 | Labrot et al. ..................... 65/158 |
| 3,800,014 A | * | 3/1974 | Brichard ......................... 264/30 |
| 4,036,626 A | | 7/1977 | Sieger et al. |
| 4,099,950 A | | 7/1978 | Pecoraro |
| 4,233,047 A | | 11/1980 | Stultz et al. |
| 4,311,508 A | * | 1/1982 | Schwenninger ............. 65/182.5 |
| 4,340,412 A | | 7/1982 | May |
| 5,147,830 A | * | 9/1992 | Banerjee et al. ................ 501/89 |

(Continued)

OTHER PUBLICATIONS

New Metpump System for Glass Furnaces Makes Construction Fast, Superior and Low Cost. Magneco/Metrel, Addison, Illinois, 2005, [online], [retrieved on Sep. 6, 2011].Retrieved from the Internet <URL: http://www.magneco-metrel.com/Links_PDF/G_2005_12_GlassFceConst.pdf >.*

(Continued)

*Primary Examiner* — Philip Tucker
*Assistant Examiner* — Yana Belyaev
(74) *Attorney, Agent, or Firm* — Abelman, Frayne & Schwab

(57) ABSTRACT

The present invention is related to a monolithic float glass forming chamber and its method of construction. The forming chamber being of the type that includes a bottom wall; side walls and a roof wall to form an elongated chamber, the elongated chamber including a forming section and a cooling section for a desired thickness and ribbon width of molten glass, wherein each type of wall comprises: a first refractory structure with a mixture of a castable and pumpable refractory material and an insulation material; and a second refractory structure with a castable and pumpable refractory material, the first and second refractory structures being formed at the same construction site.

10 Claims, 3 Drawing Sheets

U.S. PATENT DOCUMENTS

| | | | |
|---|---|---|---|
| 5,422,323 A | * | 6/1995 | Banerjee et al. .............. 501/100 |
| 5,632,937 A | * | 5/1997 | Soofi et al. ...................... 264/30 |
| 5,900,382 A | | 5/1999 | Shaw |
| 7,176,153 B2 | | 2/2007 | Anderson |

OTHER PUBLICATIONS

Rruff (Integrated Database of Raman Spectra, X-ray Diffraction and Chemistry Data for Minerals) [online]. Tucson (AZ): Department of Geosciences, University of Arizona , 2001, [retrieved Jul. 7, 2011]. Retrieved from the Internet: <http://rruff.geo.arizona.edu/doclib/hom/mullite.pdf >.*

S. Ghosh, R. Majumdar, B.K. Sinhamahapatra, R.N. Nandy, M. Mukherjee, S. Mukhopadhyay, Microstructures of refractory castables prepared with sol-gel additives, Ceramics International, vol. 29, Issue 6, 2003, pp. 671-677, ISSN 0272-8842, 10.1016/S0272-8842(02)00216-X. (http://www.sciencedirect.com/science/article/pii/S027288420200216X).*

Karen L. Scrivener, Alain Capmas, 13—Calcium Aluminate Cements, Lea's Chemistry of Cement and Concrete (Fourth Edition), Butterworth-Heinemann, Oxford, 2003, pp. 713-782, ISBN 9780750662567, 10.1016/B978-075066256-7/50025-4. (http://www.sciencedirect.com/science/article/pii/B9780750662567500254).*

S. Mukhopadhyay, S. Ghosh, M.K. Mahapatra, R. Mazumder, P. Barick, S. Gupta, S. Chakraborty, Easy-to-use mullite and spinel sols as bonding agents in a high-alumina based ultra low cement castable, Ceramics International, vol. 28, Issue 7, 2002, pp. 719-729, ISSN 0272-8842, 10.1016/S0272-8842(02)00034-2. (http://www.sciencedirect.com/science/.*

* cited by examiner

MONOLITHIC FLOAT GLASS FORMING CHAMBER AND METHOD OF CONSTRUCTION

BACKGROUND OF THE INVENTION

1. Field of the Invention

The present invention is referred to a monolithic float glass forming chamber and more specifically to a monolithic glass forming chamber and a method for the construction of the same using castable and pumpable refractory to form monolithic refractory structures by sol-gel process on site of construction.

2. Description of the Related Art

The recently developed sol-gel refractory technology, have had its mayor and more widely application in the field of metallurgical processes, like repairing and constructing linings for molten metal containers and incinerators kilns.

In a research made on related art in present subject, has shown that the application of such sol-gel refractory technology to the glass manufacturing processes is relatively limited and mainly focused towards the repair of some wear areas in the refractory structures of the glass melting furnaces. Even more specifically, none reference was found related with the application of such sol-gel refractory technology for the construction of the refractories for a float glass forming chamber.

In order to have a better understanding of the importance of the method for the construction of the refractories structures for the whole glass forming chamber, the following is an explanation about the development of knowledge and skills that have been applied trough the time in this part of the process for the glass manufacture.

Since the beginning of the application of the float process for the flat glass production about 50 years ago, the improvement in the knowledge and skills in different concurrent specialties, have resulted in very important advances incorporated in systems, materials and methods in order to improve the process control and the quality of the glass produced, besides increasing the length of campaigns of the production units having now a day targets for 14 or more years of continuous operation.

In the case of the refractory materials that form part as elements for the operation or compose within a float bath structure in the float process for manufacturing flat glass better compositions and better qualities have been developed to support the particular conditions that prevail inside the forming chamber and with glass contact positions. Also to meet such requirements and overcome or solve different type of problems aroused through the time in refractory materials located in each section of the float bath. For example for the refractories used in canal, lip, tweel and bottom blocking, different methods to manufacture had been developed and the same tendency has being observed for the roof tiles refractories assembly. Some examples are included in the next references in order to explain the diversity and complexity of such changes and developments incorporated in refractory materials for the float glass process.

At the hot end of the float process, were the molten glass coming from the melting process is continuously poured trough the canal and lip into the float bath as it is explained in U.S. Pat. No. 3,220,816, showing a method for delivering molten glass on the molten tin in a controlled way and falling freely from the spout lip to form a steady shape of glass flowing from the point of contact of such glass with the surface of molten tin the glass thereon by spreading laterally and flowing both backward and forward.

To control the flow rate of glass entering the float bath have been used a refractory element called tweel located in the canal and before the lip, as is illustrated in U.S. Pat. No. 3,445,217, which states the use of a tweel formed by two different refractories, one of them of a selected as glass wear-resistant refractory forming the lower part in the glass contact section such as fused cast zirconia, alumina or corundum material, and for the upper portion of the tweel formed by a refractory material selected for its mechanical strength and also for its resistance to thermal shock such as the use of pre-fired fire clay bonded calcined kyanite or sillimanite.

The U.S. Patent No. 3,508,902 states the use of a refractory shape named as a wetback tile which is contacted by the rearward flow of the delivered flow of molten glass. It is stated by this method that the main function of such wet back tile is to divide the backward flow and direct the same backward flow of molten glass outward each side so that it each flow may join the forward flowing portion of the glass, helping to maintain a controlled and steady flow and conducting certain kind of faults like bubbles and inclusions coming from the area of the canal lip towards the edges were do not affect the saleable section of glass ribbon.

In U.S. Pat. No. 4,099,950 it is stated the use of fused silica as refractory material to conform both the tweel and the wet back tile. The use of such material is considered an improvement in order to avoid the presence any fine seeds attributable to glass-refractory contact with tweel and wet back tile also prevents possible presence of reams or non homogeneities fine lines with different composition to that of the forming glass and coming from the wear of the tweel.

In the case of refractories that constitute the roof of the float forming chamber, also several improvements have been incorporated through the time for example, in U.S. Pat. No. 4,311,508 using a castable refractory material and an arrangement of anchors to support the roof refractory from the top in the outside and to give a nearly flat and horizontal surface in the interior of the roof. In the process for construction of such structure are used forms made of metal or wood to support the castable refractory while this hardens. Such refractory roof structure considered to be nearly monolithic due to the fact that contains small length of joints helps to prevent formation of condensates from the atmosphere of the bath, reducing with this, risks of drippings and also consequently reduce glass production losses by this cause. Besides it is considered with this arrangement to reduce the formation of cracks compared with the conventional float roof design formed by interlocked refractory tiles. As it can be seen this design still requires the use of an arrangement of anchors to support the roof structure from the outside.

Another important invention related with design and method for construct the bath roof refractory is explained in U.S. Pat. No. 4,340,412. It is stated the advantage of use a simplified roof structure having a reduced number of vertically extending joints and openings formed by relatively large refractory tiles made by precasting refractory cement material giving pieces with a flat and horizontal surface in the interior and suspended from the top by an external metallic hanger arrangement. Such reduction in joint helps to reduce the formation and dripping of condensed volatiles which contaminates the glass ribbon and tend to cause production losses. This in conjunction with the use of horizontal electrical heating elements adapted from the side walls of the chamber so that no openings through the roof structure need be provided for heating elements.

In the case of the refractory bottom blocks which are a used as a common practice in the float glass process. Such blocks made of fireclay pre-fired in dimension generally 150 to 300 cm in thickness and varying dimensions up to 50 to 70 cm in the side in preferably in rectangular shapes several changes and improvements in methods, material compositions and properties have been incorporated trough the time in order to overcome or solve different type of problems.

In U.S. Pat. No. 4,233,047, it is stated a procedure for hot and in situ repair of delaminated float bath bottom refractory blocks using blocks as inserts of high alumina with similar shape to that of the delaminated section of clay block and containing such high alumina repair insert block interconnected drills filled with tungsten rods giving to such repair insert block a greater density than the density of tin. This repair insert block will sink and may be placed into the hole formed by the lost delaminated block. This procedure for hot and in situ repair can avoid mayor costs involved in the case to stop the process for a cold repair. This procedure helps to prevent risks of glass faults as bottom surface bubbles, risks of tin leakage due to tin attack to the metal casing and other benefits as disclosed in same patent.

Another example of problem related with the use of blocks and consequently extensive presence of joints in the bottom refractory structure is explained in U.S. Pat. No. 4,036,626 in which teaches a method for preventing tin leaks in a float bath using metallic seals. Such metallic seal made of thin sheets of a metal which can be located in the lower part of bottom blocks joints and such metal sheet when in contact with molten tin, when tin penetrates between block joints can form an alloy with higher density and higher melting point than tin and by this way can seal any point of penetration of tin through joints of bottom blocks And related with procedures to manufacture or to build the refractory structures required for the float bath process in the forming chamber, one important factor that determines the design and methods up to now used for such purpose is the fact that refractories require to have their properties prior to their installation in the structure, specially for the refractory bottom blocks and for the refractory bath roof, the shapes require to have a great accuracy in properties and dimensions in order to avoid problems in their behavior during operation at working conditions. As it is established in the method of construction for the float glass forming chamber of the present application, the main properties and design requirements for such refractory structures can be obtained and improved by casting the same refractory structures on site and making use of a relatively new toll applied for the production of refractory materials called sol-gel refractory technology. We have found that the refractory materials obtained by this new technology provide several advantages for the construction of float glass forming chambers and eliminating several problems found in the past. With the method of the present application it is possible to construct refractory structures for the float glass forming chamber using the casting technique and the new sol-gel refractory technology eventually in three parts; that is, the bath bottom refractory section, the side wall refractory section and the bath roof refractory section.

The bath bottom refractory section and the side wall refractory sections are made by casting the refractory composition to form a monolithic structure. This allows having the refractory structure with eventually cero expansion joints exposed to molten tin on which the glass floats to be formed.

In the case of the bath roof refractory section, the method of construction, also allows to have a monolithic refractory structure with flexible access for maintenance of electric heating elements necessary to have a better control for the glass forming process.

The development of the sol-gel refractory technology can be derived for example with U.S. Pat. No. 5,900,382. In such patent it is stated the use of aqueous silica sol to form a binder in conjunction with phosphate and magnesia as accelerator for the process to gel. Such refractory binder found to be very useful to obtain refractories materials with wide compositions like alumina, zirconia, mullite and also alumina silicates that can harden and have good properties after short time of drying at room temperature and without requirement of firing as it is the common practice for mayor types of refractory materials.

The sol-gel refractory technology has had mayor application in the metallurgical processes for the production of iron and steel. In these processes the sol-gel refractory technology is applied for the repair and construction of refractories linings as it is stated in U.S. Pat. No. 5,632,937. In such patent it is explained a method for applying a refractory lining directly inside a metallic vessel with reduced access for the installation of molds prefabricated and instead of this, such forms or molds are assembled inside the metallic vessel and the refractory lining is formed using a castable refractory compositions prepared also in situ. Such castable refractory compositions are cast between the forms and the metallic vessel giving the required refractory lining after allowing hardening. Such method to apply the refractory linings has been proved to reduce the costs and time of such operation and can be applicable also to other kind waste incinerators and rotary kilns.

More recently, some applications of the sol-gel refractory technology for the glass manufacture process have been done as it is stated by in U.S. Pat. No. 7,176,153. Such patent describes the method for repair a glass melting furnace using colloidal silica refractories and containing mixtures with alumina, zirconia and silica compositions with a silica binder. This method for the application of such colloidal silica refractories is by means of casting, pumping, or shotcreting and mainly directed for the repair of wear parts of glass melting furnaces whether using cast blocks previously prepared or applying directly onto the wear section of the refractory structure and mainly located in contact with molten glass, that is the bottom and side wall refractories of the glass melting furnace. Such invention, states that similar repairs can be done on other parts of the glass melting furnace apart from the bottom and side wall refractories and using same colloidal silica refractories containing mixtures of alumina, zirconia and silica compositions with a silica binder.

As it was stated, in the search carried out on the related art, no applications of the sol-gel refractory technology have been found to the construction of the refractories used in the forming chamber for the float glass manufacturing processes.

SUMMARY OF THE INVENTION

Thus, one objective of the present invention is to provide a monolithic float glass forming chamber and method of construction, using refractory materials obtained by sol-gel refractory technology.

A main objective of the present invention is to provide a monolithic float glass forming chamber and method of construction, wherein the main refractory structures can be constructed on site by the casting technique in three parts; these are; the bath bottom refractory section, the side wall refractory section and the bath roof refractory section. The bath bottom refractory section and the side wall refractory section being made by casting the refractory composition to form monolithic refractory structures. This allows having the refractory structure with eventually cero expansion joints exposed to molten tin on which the glass floats to be formed.

Is other objective of the present invention to provide a monolithic float glass forming chamber and method of construction which in case of the bath roof refractory section allows to have a monolithic refractory structure with flexible access for maintenance of electric heating elements necessary for the glass process.

An additional objective of the present invention is to provide a monolithic float glass forming chamber and method of construction which allows repairing exclusively damaged points in terms of areas and thickness of the refractory sections at the end of campaigns in an easier way and with lower costs using the same procedure and same composition of material instead of removing whole blocks as it is required in traditional procedure.

Is another objective of the present invention to provide a monolithic float glass forming chamber and method of construction that uses for the construction of the refractory structure, a new refractory material commercially available in the market by companies like Magneco Metrel, Inc. The material selected for this method has been the Metpump IPSX G which have proved to have acceptable properties for use in float baths in contact with molten tin and bath atmosphere and have the next chemical composition; approximately 60/65% $Al_2O_3$, 30/35% $SiO_2$, 3.5% ($TiO_2+Fe_2O_3+CaO$) and 0.5% $Na_2O$. Another compositions evaluated which gave also good results have as main component 40, 50 and 90% $Al_2O_3$. This type of material have been developed using the sol-gel technology, giving a colloidal silica refractory structure, which have several important properties, like low porosity, low thermal expansion, low gas permeability, high homogeneity, high hot strength, etc.

Other objective of the present invention is to provide a monolithic float glass forming chamber and method of construction that avoids the need for the refractory to be previously fired for use at high temperatures and can be easily cast to have the required shapes directly on site of the construction.

These and others objectives and advantages of the monolithic float glass melting forming chamber and method of construction of the present invention can be viewed by the experts in the area in the following detailed description of the preferred embodiments of the invention, which will be placed within the scope of the invention claimed.

DETAILED DESCRIPTION OF THE INVENTION

The monolithic float glass forming chamber and method of construction using castable and pumpable refractory to form monolithic refractory structures by sol-gel process on site of construction will be described below making reference to the specific embodiments of the same and to the drawings enclosed as figures, where the same signs refer to the same parts of the shown figures.

Figure 1:
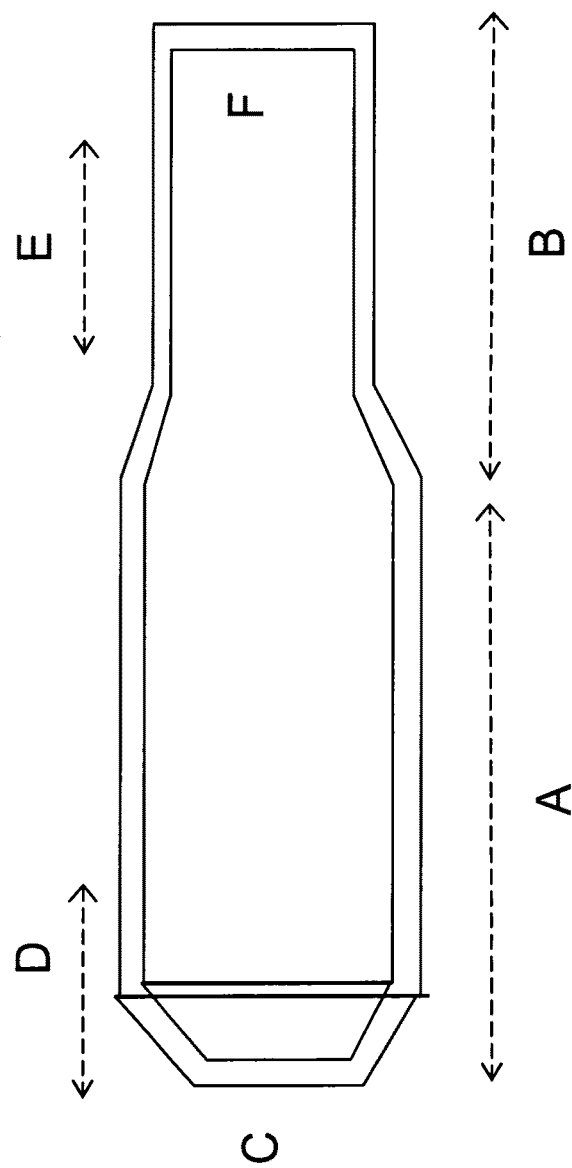
FIG. 1, is a plan view showing the principal sections of a monolithic float glass forming chamber for the float glass manufacturing process.

Making reference particular to the FIG. 1 is a plan view showing the principal sections of float glass forming chamber for the manufacture glass plates which consists of a forming section (A) and a cooling section (B). The molten glass flows entering the bath to float on molten tin at the hot end (C), through of a zone for heating and cooling equipment (D and E) and where forced to a exit end (F) by mechanical equipment wherein a glass ribbon is forced whether pulling or retaining it in order to have the required thickness profile and where also simultaneously it is required to control the glass temperature whether removing heat using a series of water cooled steel pipes or adding heat using a system of electric heating elements.

Figure 2:
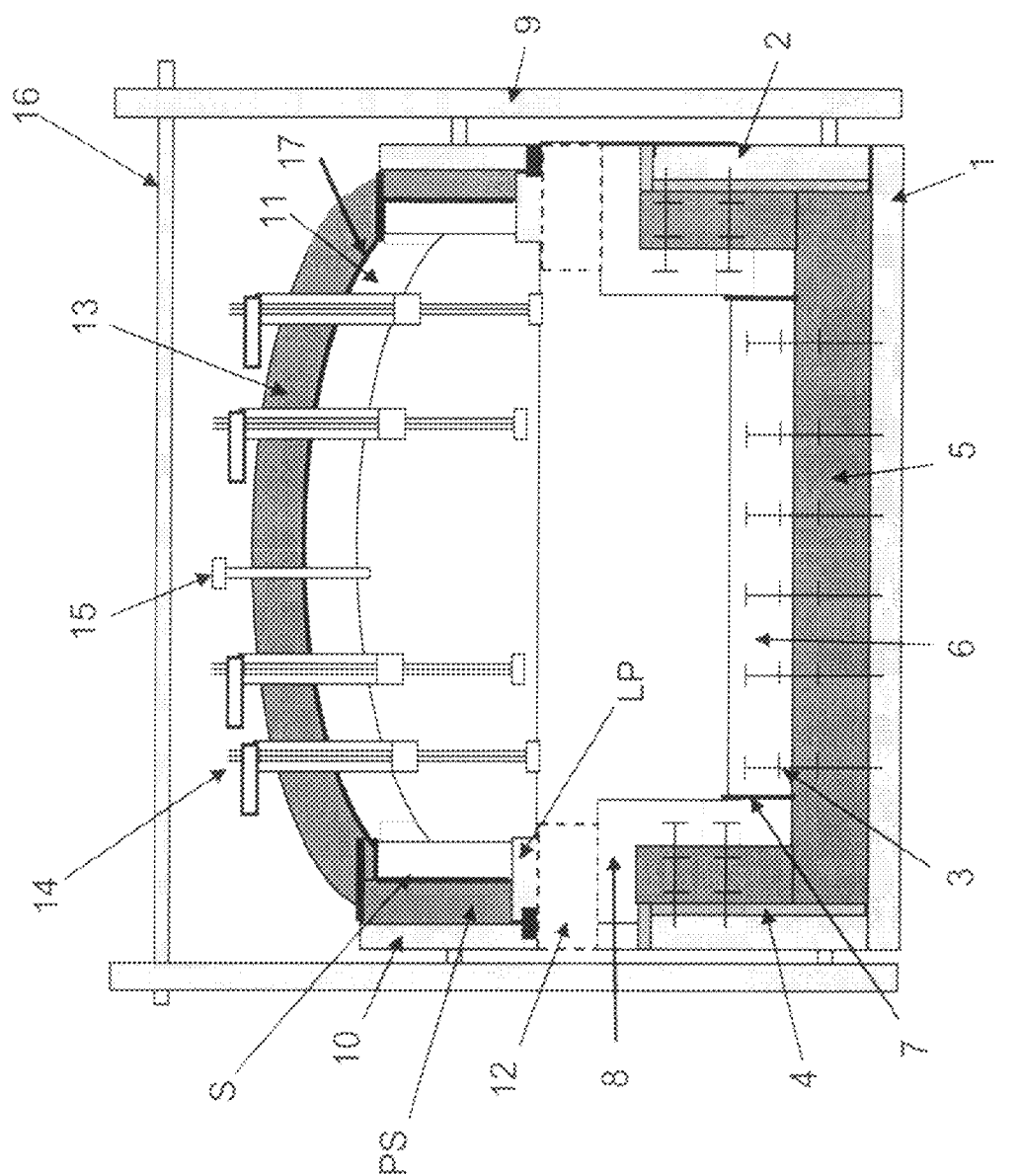
FIG. 2 is a cross section of the float glass forming chamber in the zone for heating and cooling equipment of the forming section of the chamber; and, FIGS. 3 and 4, shows schematic views of the construction of metal anchors to fix the bottom refractory structure to the bottom metal casing.
Figure 4:
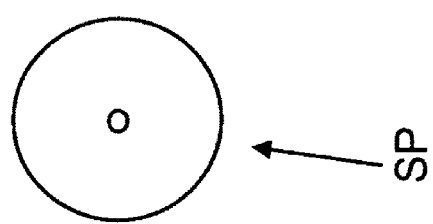
Figure 3:
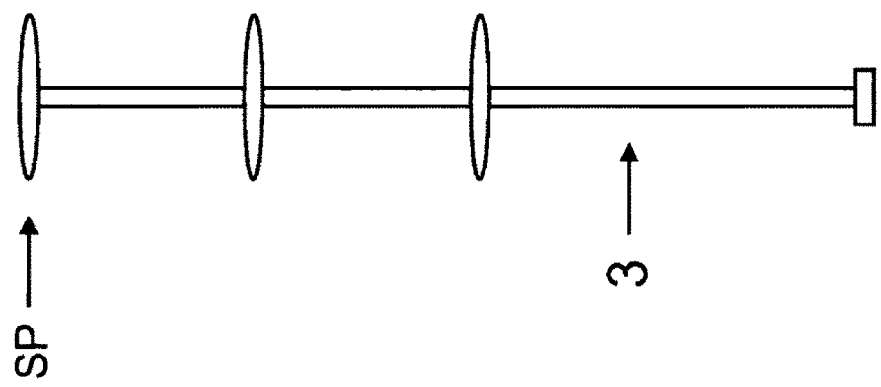

The FIG. 2 is a cross section of the float glass forming chamber in the zone for heating and cooling equipment of the forming section of the float bath structure, which will be now described. As can be of the FIG. 2, the structure of the refractory construction made by the method of the present invention comprises: a bottom casing (1) which is a thick plate of steel that supports and contents the refractory assembly, in conjunction with the sidewall casing (2) also made with steel plate. To the bottom casing (1) and side wall casing (2) are welded a system of metal anchors (3) made of steel cold rolled and small rounded steel plates (SP) as shown with more detailed in FIGS. 3 and 4. The first layer of refractory material is composed of an insulation material (5) which is a pumpable and castable refractory material that has the next properties after solidified or hardens; a low heat transfer coefficient, low density and also low thermal expansion. The main layer of refractory is composed of the bottom refractory (6) and the main side wall refractory (8). Between these two sections of refractories is left a perimeter bottom expansion gap (7), whose main purpose is to provide a refractory discontinuity to avoid any risk of bubble generation by gas diffusion. Such main layers of refractory are made of a castable refractory material with specific characteristics and properties in terms of porosity, gas permeability, thermal expansion and chemical composition, these characteristics and the method to produce such refractory structure are proved to allow the material to perform in a superior way in terms of durability at the extreme working conditions like high temperatures, molten tin attack and alkali chemical attack, thermal changes, etc. together with a consistence stable behavior to allow a minimum affectation to the quality of the glass ribbon due to bubble generation by refractory porosity and gas permeability. Between the side wall casing (2) and the cast refractory insulation material (5) is a layer of ceramic cushion material (4), which provides a necessary gap for the thermal expansion of the refractory system at the working temperatures.

In the roof refractory, it is considered the use of a side support columns (9) made of steel where are supported the side structure support (10) also made of steel to support the roof refractory assembly. The inner refractory section is formed by the roof refractory (11), made of a castable refractory material with specific characteristics and properties in terms of porosity, gas permeability, thermal expansion and chemical composition, these characteristics and the method to produce such refractory structure are proved to allow the material to perform satisfactory in terms of durability at the specific working conditions like temperatures, gases atmosphere and including presence of alkalis in the vapor phase, thermal changes, etc. On top of such main layer of refractory, it is located the insulation refractory material (13), which is also a castable refractory material and that after solidified has properties like; low heat transfer coefficient, low density and also low thermal expansion. Through the two layers of refractory materials are left enough accesses to install the electric heating modules (14) that supply the required energy for the temperature control to form the glass ribbon. Such electric heating modules (14) have the advantage that can be replaced when it is necessary, for example by breakage or chemical degradation. Also through of the two layers of refractory, are left accesses for the atmosphere supply or pyrometers (15). Such accesses are used whether for supply atmosphere (a mixture of nitrogen and hydrogen) or to install supports for pyrometers at desired positions in order to allow the measurements of temperature of glass ribbon for the process control. Between the side structure support (10) and the main side refractory (8), it is the side sealing (12), formed by metal boxes filled with insulation material and that can be removable when necessary to provide access and windows to the internal process through all the perimeter of the float bath.

Under the process of the present invention the refractory sections can be made by the casting technique eventually in two parts, that is the bath bottom refractory section and the roof refractory section In the case of the bath bottom refractory section and in order to understand in a better way the present invention it is important to explain the following. Traditionally in the construction of float baths has been required the use of big size refractory blocks to be installed in the bottom structure to contain the liquid tin and to give the stable and controlled thermal and mechanical support for the continuous glass ribbon which is processed at temperatures from 1,100° C. at the hot end (C) to the 600° C. at the exit end (F). The fact of use molten tin for the float glass process, influence in several ways the engineering of the design. One very important aspect is the big difference in density between tin (7.3 gr/cm3) and common refractories (around 2.5 gr/cm3) for the glass process. This big difference in densities requires assuring to maintain the bottom refractories in their position and to avoid the strong force of buoyancy, besides to reduce at the minimum as possible the length of extension of joints between refractory blocks because such joints can act as potential sources for bath bubble faults and other type of problems.

Under the method of the present invention the construction of the bath bottom refractory is made eventually in one piece and without none joint area. To obtain this, the next steps are performed.

A system of metal anchors (3) is welded to the bottom and side wall casings (1) and (2), to maintain fixed the refractory basement. Such metal anchors are made with rolls ¾ diameter and flat rounded plates of 4 in. diameter and ¼ in. of thickness. Such metal anchors are welded prior to the casting of refractory materials. Important factors in the design of anchors are to consider the use of a low expansion steel and high resistance to oxidation like for example a 309 or 310 stainless steel. Also important is to avoid acute shapes and instead have curved shapes and edges to minimize tendency to cracks generation to refractory structure.

The insulation refractory material (5) is formed by casting a castable refractory mixture in a composition for example from 40 to 50% $Al_2O_3$ and any of the next additives as carlita, thermolita, perlita or verelite, which can supply insulation properties to the refractory structure formed by sol gel process with good mechanical and thermal properties. The insulation refractory material mixed with the insulation additive can be formed in a required thickness that can be from 10 to 20 cm. By means of common hand vibrators bars is assured to get the desired density of such castable mixture, removing excess of trapped air and to avoid cavities. Firstable it is formed the bottom part and after can be formed the sidewall insulation by the help of a wall of contention using metal plates to give the required space to form by casting the complementary refractory material.

In a similar way, the main bottom refractory (6) and main side refractory (8) layers are formed by casting a castable refractory mixture and in a required thickness, preferably from about 10 to about 20 cm. By means of common hand vibrators bars is allowed to get the desired density of such castable mixture, removing excess of trapped air and to avoid cavities. Firstable it is formed the bottom part and after is formed the main sidewall refractory by means of a wall of contention using metal plates as forms or moulds to give the required space to form by casting the complementary refractory material and also to leave the perimeter expansion gap (7) which its main purpose is to prevent gases diffusion to cause bubble faults in the glass production.

Once the main bottom refractory layer is formed, the upper surface is polished by means of a floor rotary polishing machine, to eliminate possible imperfections like roughness, and to have a desired flat and smooth surface.

On the other hand to construct the bath roof refractory section using the method of the present invention, the next main steps are performed.

To a side metal support columns (9) are fixed the metal side structure support (10) for support the roof refractory (11) and the insulation refractory material (13)

Firstly, a metallic or wood structure is formed, which contains the shape of the roof refractory (11), said structure comprising a pair of parallel plates to each side, leaving an space between each other, to form side support walls; and a removable arch structure of a convex-shaped to form the roof, having an internal space, which is resting on the support walls. The structure is rested on the lower part (LP) of the metal side structure support (10), leaving a parallel space PS between the side structure support (10) and the structure S.

After the structure is filled with a castable refractory material, in a required thickness that can be from 10 to 20 cm and by means of common hand vibrators bars, it is allowed form the desired density of such castable mixture removing excess of trapped air and to avoid cavities. In this step prior to cast the bath roof refractory (11), it is important to leave the required spaces for access for electric heating modules (14) and access for atmosphere supply or pyrometers (15) using sections of polystyrene (or equivalent material) pieces made with the required and slightly conical shape (from 5 to 10°) and prepared in the surface with lubricant grease or a double thin plastic film, in order make easy the removal when the refractory mixture hardens. After, the castable refractory material has been casted and the roof and side walls (main bath roof refractory 11) have been formed, the metallic or wood structure is disassembled.

Once that the bath roof refractory (11) is formed, a thin sheet of metal layer (17) and preferably made of stainless steel with high resistance to oxidation and with low expansion coefficient is placed on the upper surface of the bath roof refractory (11). This sheet of metal (17) prevents diffusion and escape of gases to the atmosphere.

Finally a metallic or wood cover is placed over the bath roof refractory (11), which is supported on the each side structure support (10), leaving a space between the upper part of the sheet layer (17) and the metallic or wood cover, in order to be filled with the mixture of the castable and pumpable refractory material and the insulation material to form the complementary insulation wall (13). The castable refractory material is preferable a composition from 40 to 50% $Al_2O_3$ and any of the additives such as carlita, thermolita, perlita, verelite or mixture of the same, which can supply insulation properties to the refractory structure formed by sol gel process with good mechanical and thermal properties. The mixture of insulation refractory material and additive can be formed in a required thickness that can be from 10 to 20 cm and by means of common hand vibrators bars it is allowed form the desired density of such castable mixture removing excess of trapped air and to avoid cavities. In this step, the extension of required spaces for access for electric heating modules (14) and access for atmosphere supply or pyrometers (15) using the same sections of polystyrene (or equivalent material) with a slightly conical shape (from 5 to 10°) prepared and left in the main bath roof refractory.

After the monolithic refractory structure has harden, the polystyrene (or equivalent material) shapes, are removed and also it is removed the metallic or wooden structure to allow to continue to dry the refractory structure to the ambient air at room temperature.

Side supports tensors (16) assure the required rigidity to the structure caused by the weight of the roof refractory assembly transmitted to the side structure support (10).

According with an evaluation made on differential chemical compositions (40, 50, 60, 70 and 90% $Al_2O_3$) of several considered refractory material compositions and prepared by casting to be used with the method of the present application, following are a resume of results compared with a standard 40% $Al_2O_3$ refractory material commonly used for bath bottom blocking. The evaluation consisted mainly in the next points and related with behavior inside float bath at 1100° C. during 30 days in terms of cold crushing strength and metal Sn and $Na_2O$ vapor penetration in their structure. Also were tested the thermal shock resistance in cooling cycles to room temperature in air and with more intense conditions of thermal shock tests cooling submerging in water at room temperature.

| Composition | Standard 40% Al2O3 | 40% Al2O3 | 50% Al2O3 | 60% Al2O3 | 70% Al2O3 | 90% Al2O3 |
|---|---|---|---|---|---|---|
| % Na2O increased in surface composition after 30 days inside Float Bath at 1100° C. | 0.393 | 0.234 | 0.171 | 0.129 | 0.218 | 0.408 |
| % Sn increased in surface composition after 30 days inside Float Bath at 1100° C. | 0.00 | 0.00 | 0.00 | 0.029 | 0.00 | 0.00 |
| Cold crushing strength after 30 days inside Float Bath at 1100° C. (MPa). | 19 | 20 | 25 | 35 | 24 | 45 |
| Number of thermal shock cycles (1000° C. - Air room temperature - 1000° C.) | +20 | +20 | +20 | +20 | +20 | +20 |
| Number of thermal shock cycles (1000° C. - Water room temperature - 1000 C.) | 19 | +40 | +40 | +40 | +40 | +40 |

The above results show that silica colloidal compositions with 40, 50, 60 and 70% $Al_2O_3$, have lower $Na_2O$ penetration compared with standard 40% $Al_2O_3$. In terms of cold crushing strength, all silica colloidal refractory compositions 40, 50, 60, 70 and 90% $Al_2O_3$, have better resistance compared with standard 40% $Al_2O_3$. In case of Sn penetration analysis, only colloidal compositions with 60% $Al_2O_3$ showed signs of metal penetration. And also a very important test carried out, that is the Thermal shock evaluation, showed a better resistance with all silica colloidal refractory compositions 40, 50, 60, 70 and 90% $Al_2O_3$ compared with standard 40% $Al_2O_3$.

All the above is in understanding that the aforesaid description of the invention, is only provide in order to show the specific embodiments of the same and the better way to develop it as of the time when this patent application is flied and the invention will not be limited to these, but its scope must be considered regarding to the following claims:

We claim:
1. A method for the construction of a monolithic float glass forming chamber which comprises:
   forming a first refractory structure by mixing a castable and pumpable refractory material comprising from about 40 to about 90% by weight of $Al_2O_3$, and an insulation material selected from carlite, thermolite, perlite, verelite or mixtures of the same; and, forming a second refractory structure of the castable and pumpable refractory material comprising from about 40 to about 90% by weight of $Al_2O_3$, said structures are formed on the construction site, and wherein the forming of the first and second refractory structures are carried out by a sol-gel process;
   wherein the monolithic float glass forming chamber includes a bottom refractory wall characterized by:
   forming on a bottom metal casing, a first bottom wall by mixing the castable and pumpable refractory material and an insulation material;
   placing two vertical parallel plates, which are separated one from the other on two lateral sides of the first bottom wall;
   filling the two vertical parallel plates with the mixture of the castable and pumpable refractory material and the insulation material to form first side walls;
   separating the two vertical parallel plates once the mixture of the castable and pumpable refractory material and the insulation material have been cast and the first side walls have been formed;
   forming a second bottom wall with a castable and pumpable refractory material on said first bottom wall;
   placing parallel plates separated from the first side walls forming a space between said first side walls and the plates;
   filling the space with the castable and pumpable refractory material to form second side walls; and
   separating the parallel plates once the castable refractory material has been cast and the second side walls have been formed.
2. The method for the construction of a monolithic float glass forming chamber as claimed in claim 1, wherein the forming of the second side walls and second bottom wall includes: forming a perimeter expansion gap between the second side walls and second bottom wall to prevent diffusion of gases which cause bubble faults in the glass production.

3. The method for the construction of a monolithic float glass forming chamber as claimed in claim 1, wherein the second bottom wall comprises:
  polishing an upper surface of the second bottom wall to eliminate imperfections and to have a desired flatness and smooth surface finishing.

4. The method for the construction of a monolithic float glass forming chamber as claimed in claim 1, including the step of welding metallic anchors to the bottom and side walls of the casing; and forming the first bottom wall, the first side walls, the second bottom wall and second side walls, the metallic anchors remain fixed to the bottom and side walls of the casing.

5. The method for the construction of a monolithic float glass forming chamber as claimed in claim 1, including the step of providing a layer of a ceramic cushion material between side walls of the casing and the first side walls of the bottom refractory wall to provide a gap for the thermal expansion of the castable and pumpable refractory material at the working temperatures.

6. The method for the construction of a monolithic float glass forming chamber as claimed in claim 1, wherein the monolithic float glass forming chamber includes a roof refractory wall, characterized by:
  providing side structure supports, said side structure supports being attached to side support columns;
  assembling a removable wood structure with the shape of the roof refractory wall, a lower section of said removable wood structure is supported by each side structure supports, said wood structure comprising a pair of parallel plates, each pair of parallel plates being placed to each side of the wood structure, said pair of parallel plates including a hollow space between each other to form said side support walls; and
  a convex shaped arch structure to form a first roof refractory wall, having an internal space, which is supported on the walls, side structure support having a parallel space between the side structure support and the wood structure;
  filling the hollow spaces with a castable refractory material to form the side support walls and the first roof refractory wall on the convex shaped arch structure;
  disassembling said removable wood structure once the castable refractory material has hardened and the first roof refractory wall has been formed;
  providing a sheet of metal layer on the upper surface of the first roof refractory wall to prevents diffusion and escape of gases from the float glass forming chamber to the ambient atmosphere;
  placing a removable wood cover over the sheet of metal layer, said removable wood structure being supported on each side structure support, leaving a hollow space between the upper part of the sheet layer and the wood cover;
  filling the hollow space defined between the top surface part of the sheet of metal layer and the wood cover with the mixture of the castable refractory material and an insulation material to form a second roof refractory wall; and,
  separating the cover once the mixture of the castable refractory material and the insulation material have been cast and the second roof refractory wall has been formed and hardened.

7. The method for the construction of a monolithic float glass forming chamber as claimed in claim 6, wherein the forming of the first roof refractory and second roof refractory wall further comprises the step of: providing removable sections to shape required spaces to install heating or atmosphere supply elements on the first roof refractory and second roof refractory wall; and removing said removable sections once the first roof refractory and second roof refractory wall has been formed and hardened.

8. The method for the construction of a monolithic float glass forming chamber as claimed in claim 7, wherein the removable sections are polystyrene.

9. The method for the construction of a monolithic float glass forming chamber as claimed in claim 6, wherein the roof refractory wall further includes; providing removable sealing means to said roof refractory wall, to provide access to the internal monolithic float bath refractory structure.

10. The method for the construction of a monolithic float glass forming chamber as claimed in claim 1, wherein the bottom refractory wall, further includes; providing removable sealing means to said main bottom refractory wall, to provide access to the internal monolithic float bath refractory structure.

* * * * *